INVENTORS
JAMES A. LAGOE
DAN H. KUSAKA
BY Bruce C Lutz
ATTORNEY

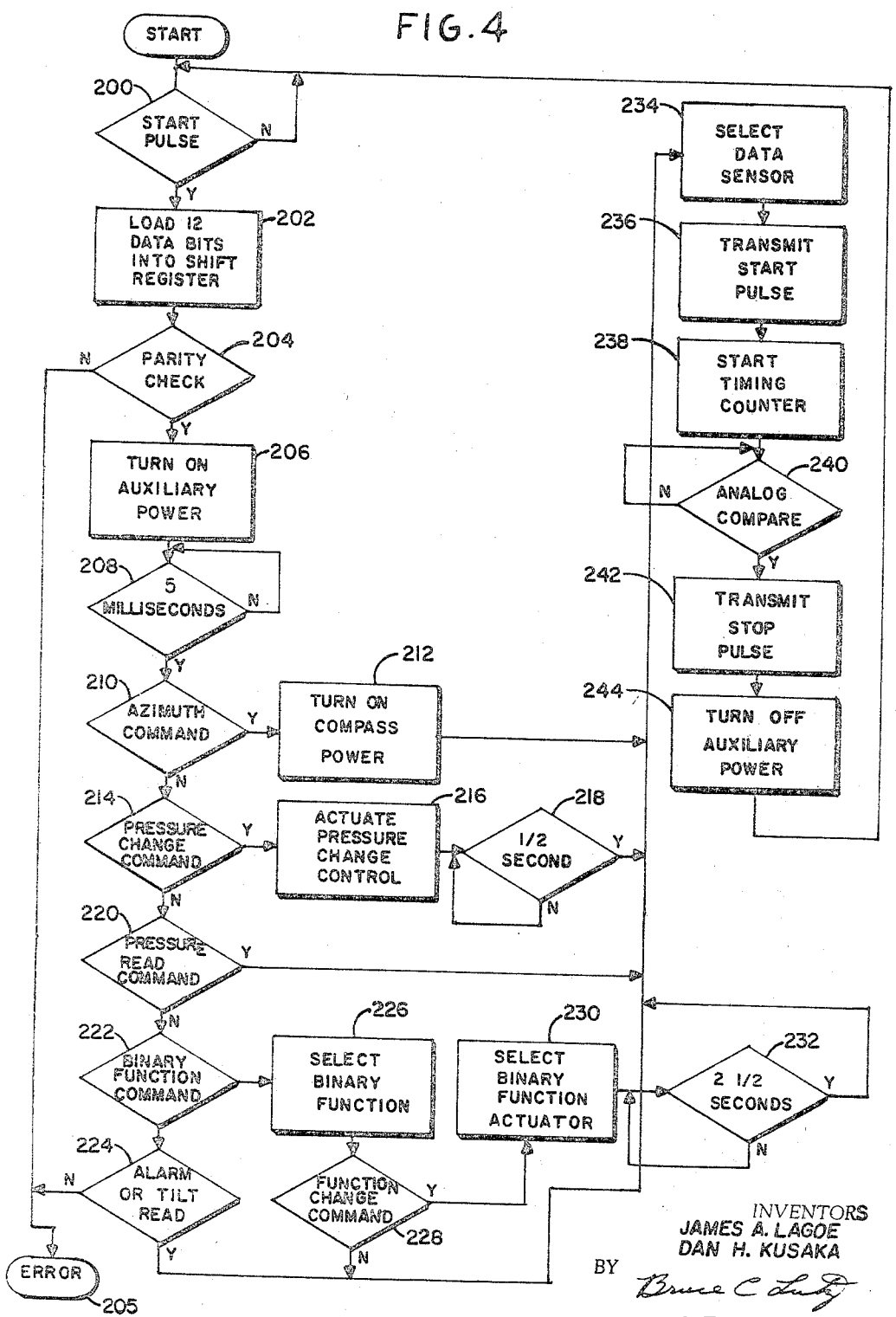

United States Patent Office 3,427,554
Patented Feb. 11, 1969

3,427,554
CONTROL APPARATUS
James A. Lagoe, Woodinville, and Dan H. Kusaka, Seattle, Wash., assignors to Honeywell Inc., Minneapolis, Minn., a corporation of Delaware
Filed July 3, 1967, Ser. No. 650,861
U.S. Cl. 340—5
Int. Cl. H04b 11/00, 13/02
7 Claims

ABSTRACT OF THE DISCLOSURE

A system comprising a surface electronic unit, and underwater electronic unit, and an underwater battery unit wherein commands are generated either automatically or manually in acoustical codes by the surface unit and transmitted to the underwater unit. The underwater unit receives and decodes these commands executing a control function and generates and codes a new status word indicative of some condition in the remote unit and transmits it acoustically to the surface unit where it is received, decoded, and displayed.

---

The present invention is generally related to electronics and more particularly related to a method for controlling operations at a remote station and for sensing conditions at the remote station some of which may be indicative of the controlled function. While there are other types of telemetering and control systems for operating remote stations, it is believed that the particular configuration of the present invention provides increased accuracy and more positive control, especially under water, than the prior art units.

Therefore, it is an object of this invention to provide improved control and telemetering equipment.

Figure 1:
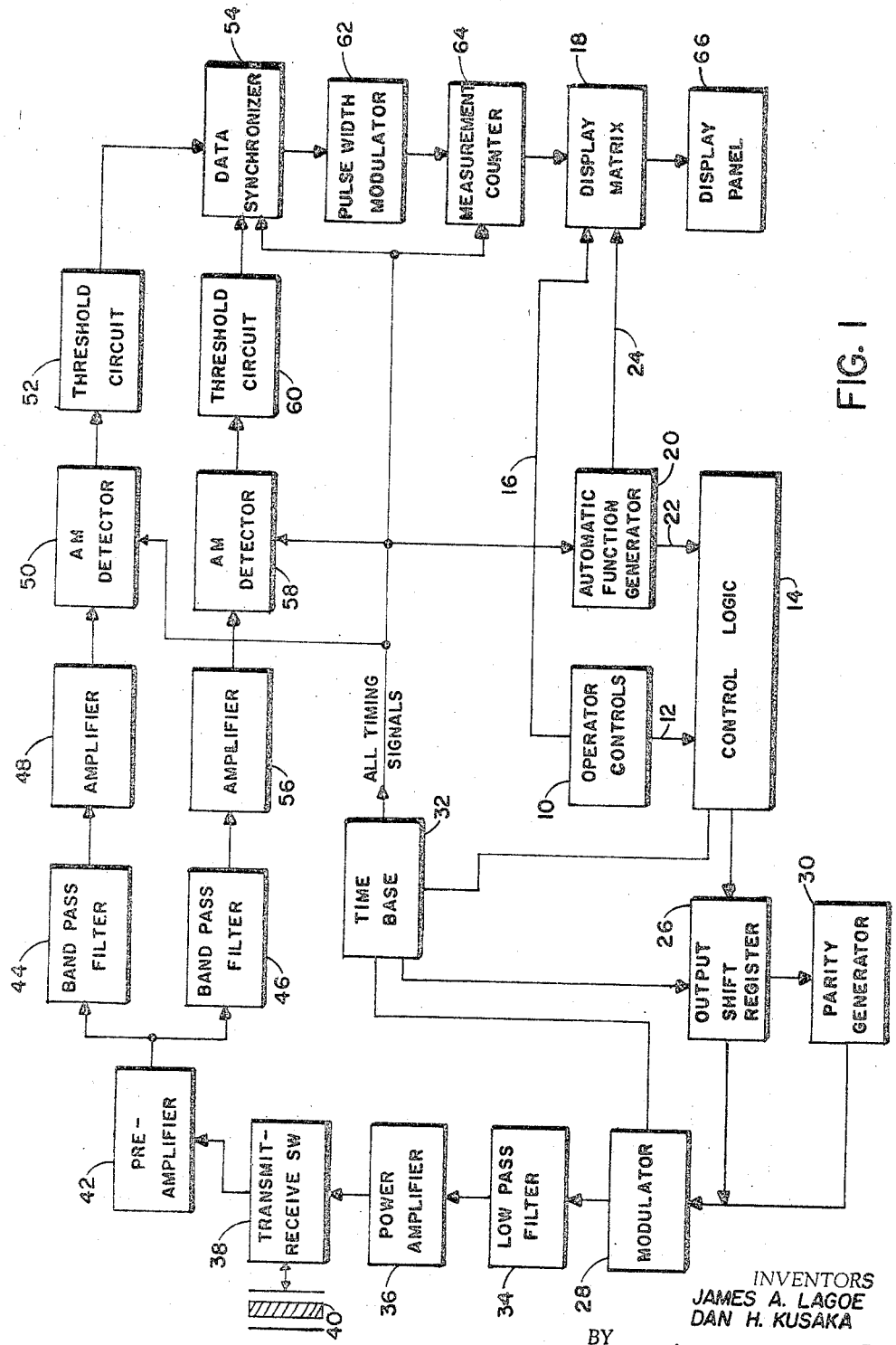
Figure 2:
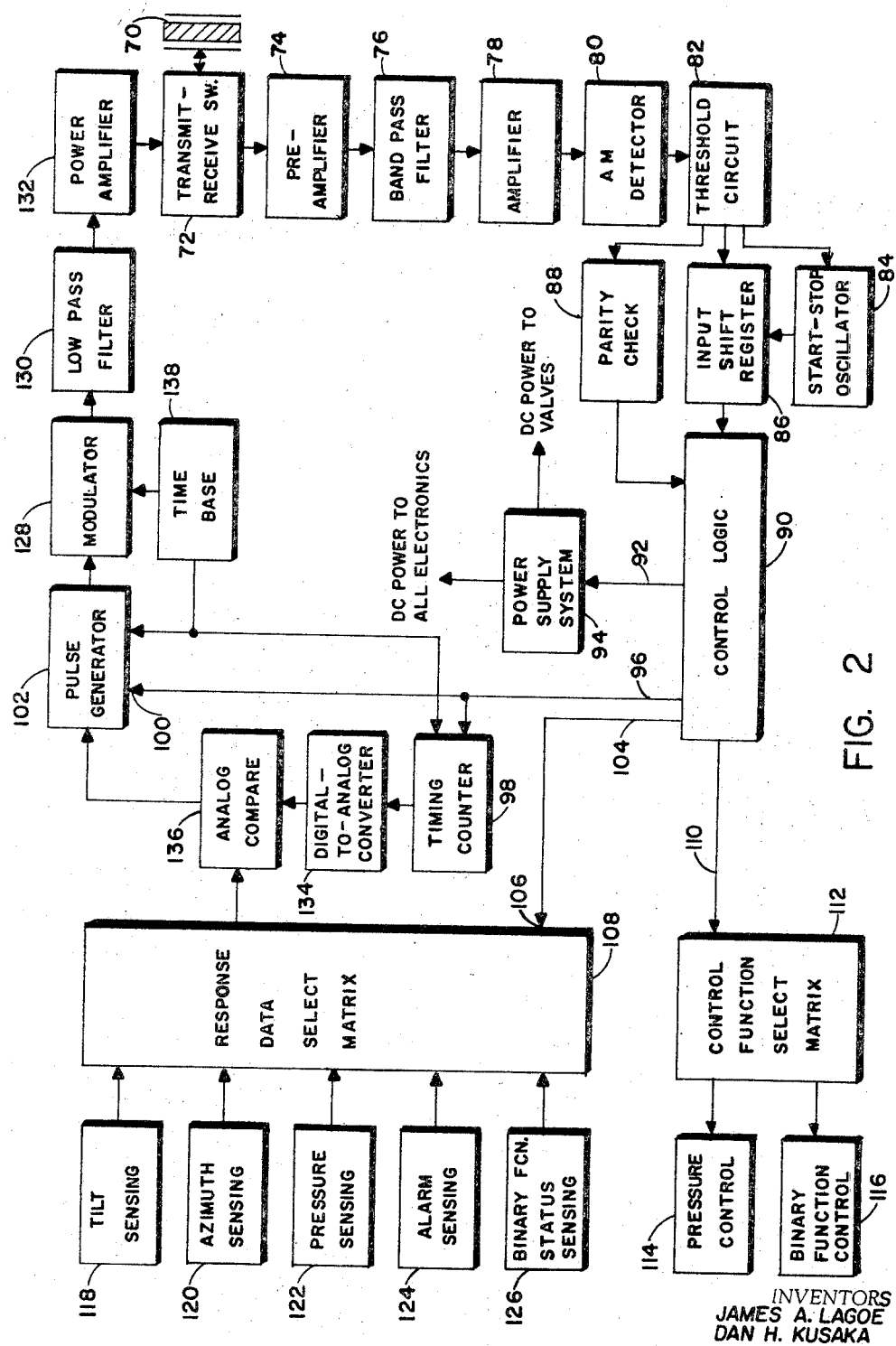
Figure 3:
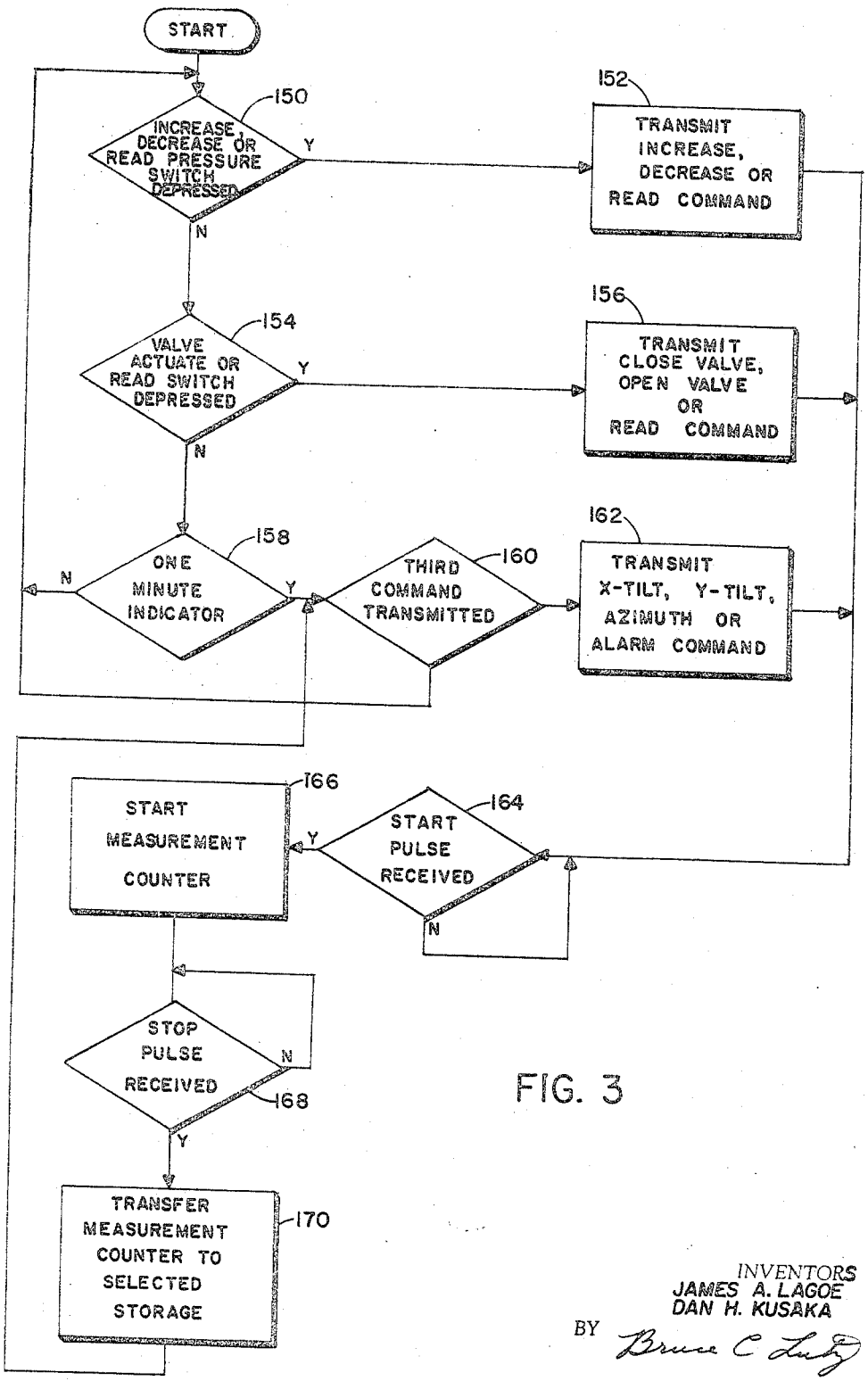

Further objects and advantages of the present invention will be apparent from a reading of the specification and appended claims in conjunction with the drawings wherein:

FIGURE 1 is a block schematic diagram of the operator control unit;
FIGURE 2 is a block schematic diagram of the remote unit; and
FIGURES 3 and 4 are flow diagrams of the operations of the blocks in FIGURES 1 and 2 respectively.

The present invention in one embodiment is used to control and monitor various functions of a deep water oil drilling system. These functions include among other things, the control and monitoring of a blowout preventor stack and a monitoring of the tilt and azimuth orientation of the system and the relative angle of a riser ball or flex joint. All of these control and monitoring functions are accomplished by means of an acoustic communications link between a surface vessel or operator control station and an underwater system or remote station. This system eliminates any need for a physical electrical connection therebetween.

The system comprises a surface electronics unit, an underwater electronics unit, and an underwater battery unit. In normal operation, commands are generated either automatically or manually, and coded by the surface unit and transmitted acoustically to the underwater unit. The underwater unit receives and decodes these commands, executes a control function, generates and encodes a new status word indicative of some condition in the remote unit and transmits it acoustically back to the surface where it is received, decoded and displayed.

As will be realized by those skilled in the art, various modifications may be made to the electronics to utilize the basic idea for other control and telemetry systems and that this is only one embodiment of the invention.

In FIGURE 1, a block 10 labeled operator controls is utilized to generate commands by an operator. Block 10 is connected through a first connection 12 to a control logic circuit 14. It is also connected by a lead 16 to a display matrix 18. Commands are also generated by an automatic function generator 20 which supplies signals through a lead 22 to control logic block 14 and also to block 18 through a lead 24. As will be realized, any of the leads or wires just mentioned and many to be mentioned later in the specification actually comprise a large number of individual wires and the terminology used in referring to a lead or wire is to prevent undue complexity and wordiness is describing the system. The automatic function generator 20 on a fixed time basis generates commands for continuously monitored functions. The commands from either blocks 10 or 20 are passed through the control logic in a predetermined fashion to an output shift register 26 for encoding before being passed to a modulator 28. The output of shift register 26 is monitored by a parity generator 30. The shift register 26 provides a 10-bit control word and the parity generator adds a parity bit in the twelfth bit position. In this particular embodiment, the parity generator 30 completes the 12-bit word with an odd parity. In other words, the control word has an odd number of ones. The parity bit is used for protection against transmission errors in the command and will be checked by the remote unit before any command is executed. The number or parity of ones or zeroes could just as well be made even if so desired. A time base generator 32 supplies carrier signals to modulator 28 and also provides timing signals to any other blocks that may require such timing signals. All the connections are not shown so as to reduce the complexity of the circuit diagram. The output shift register 26 adds a single start bit to the 10-bit control word before it is shifted to the modulator 28. Thus, there are 10 bits in the control word, and in addition a start bit and a parity bit to provide a total of a 12-bit word for transmission. The output of modulator 28 is passed through a low pass filter 34 and then through a power amplifier 36 to a transmit-receive switch 38. In the transmit position, the block 38 supplies an output signal to a transducer generally designated as 40. In a receive condition, the transmit-receive switch 38 receives signals from transducer 40 and supplies the signals to a pre-amplifier 42 to two band pass filters 44 and 46. The receive signal in the present embodiment consists of two 11.6-millisecond (msec.) pulses, one at 43.95 kilohertz (kHz.) and one at 41.65 kHz. The time period between the two pulses indicates the present status of the interrogated or controlled function at the remote station.

It should be noted that the modulator 28 is a simple circuit which is merely an ON–OFF keyer, which generates a pulse of a continuous wave carrier for each "one" in the code word. The modulator output comprises a 2.91-msec. pulse of a 43.95-kHz. square wave carrier for each one and a 2.91-msec. time period with no output for each zero in the code word.

Band pass filter 44 is centered at one of the two received frequencies and therefore the output signal from this filter is a pulse primarily comprised of the center frequency. This output is passed successively through an amplifier 48, an amplitude modulation detector 50, and a threshold circuit 52 to a data synchronizer 54. The band pass filter 46 is centered at the other of the two received frequencies and the output comprises a pulse of this frequency which is passed through an amplifier 56, an amplitude modulation detector 58 and a threshold circuit 60 to the data synchronizer 54.

Pulse detection is accomplished in the detectors 50 and 58 by a simple diode envelope detector with an RC low pass filter. The detected pulses are integrated until a voltage threshold is reached at which time a regenerated receive pulse is formed. The synchronizer 54 samples the outputs of the two threshold circuits 52 and 60 with a synchronous clock pulse. Thus, two pulses are obtained wherein the space therebetween represents data from the controlled or interrogated function. The pulses are supplied to a pulse width modulator 62 to provide a single pulse whose period is equal to the timing between the two received pulses. The output of the modulator 62 is supplied through a measurement counter 64 where it is converted to a binary coded decimal number representing the return data to the display matrix 18. This matrix takes the return data along with the original command information from either block 10 or 20 and directs the received data to the proper indicator or readout on a display panel 66 which is connected to receive signals from the matrix 18. The return signal could be a binary decision such as a valve open/valve close or alarm/no alarm so that the counter would be at one of two count values. However, the return data signal could be an analog value such as a pressure reading or a tilt measurement. In the case of a binary decision, one of two indicators can merely be lighted while if it is an analog value or response, an output can be displayed on a set of neon numerical readout tubes or any other such display apparatus.

In FIGURE 2 a transducer 70, which may be the same as transducer 40, is used to receive signals at the remote station. The signals received by transducer 70 are applied through a transmit-receive switch 72 to a pre-amplifier 74. The signals are passed from pre-amplifier 74 successively through a band pass filter 76, an amplifier 78, and an amplitude modulation detector 80 to a threshold circuit 82. The last mentioned components are similar to the receiving section of FIGURE 1 except that there is only a single frequency involved. The threshold circuit 82 supplies outputs to a start-stop oscillator 84, and input shift register 86 and also to a parity check 88. The start-stop oscillator 84 is further connected to supply a second input to shift register 86. The outputs of the shift register 86 and the parity check 88 are both applied to a control logic circuit 90. The start bit after actuating the threshold circuit will start the oscillator 84. This oscillator is used to sample the latter received data bits into the shift register 86. The received data from the transducer which is applied at the output of the threshold circuit 82 is also supplied to the parity check 88 and the number of ones is counted. If this number is odd (in other words parity check valid, the command is acted upon. Otherwise, the received data is ignored. Thus, no reply is generated by the rest of the circuitry and the surface unit after predetermined time period indicates an error if such a reply is not received within that time period. The control logic 90 has a plurality of outputs. A first output 92 is connected to a power supply system 94 while a second output 96 is connected to an input of a timing counter 98 and also to an input 100 of a pulse generator 102. A third output 104 of control logic 90 is connected to an input 106 of a response data select matrix 108. A final output 110 of logic 90 is supplied as an input to a control function select matrix 112. The control function select matrix 112 supplies signals to pressure control 114 and a binary function control 116.

A plurality of condition sensing blocks labeled tilt sensing 118, azimuth sensing 120, pressure sensing 122, alarm sensing 124 and binary function status sensing 126 have outputs supplying signals to matrix 108. If the parity check circuit 88 determines that the command is valid for control operation, the matrix 112 selects the particular pressure regulator or binary function. This requested command is then initiated by either of the blocks 114 or 116. In either case, the control function applies a high power direct current pulse of a proper polarity to the selected valve or regulator.

After a delay in time sufficient for the complete actuation of the requested command, the proper response sensor is selected by the matrix 108. If the pressure control was actuated, the pressure sensing block 122 would be selected to provide an output signal. If the command was merely for an azimuth, tilt, or alarm reading, the response data select matrix 108 is entered immediately without providing a control function. As will be realized, the control logic 90 controls all the functions in its basic logic. Regardless of the type of response required from the different condition sensing elements 118–126, the output of the matrix is an analog voltage. As previously indicated, if the response is a valve or alarm status, the voltage will take one of two levels. If the response is a tilt, azimuth or pressure response, it will be a voltage proportional to the response level. When a response is available for transmission, a signal from the control logic 90 causes the pulse generator 102 to supply as an output a single 11.6-msec. pulse through a modulator 128, a low pass filter 130, and a power amplifier 132 to transducer 70 through the transmit-receive switch 72. The control logic 90 also starts the timing counter 98 counting at an 86 count per second rate. This timing counter 98 is a simple 8 bit binary counter whose output is converted to an analog voltage by a digital to analog converter or integration means 134 whose output controls an analog compare circuit 136 which compares the input from the digital analog converter 134 with an input obtained from the matrix 108 so as to provide an output to the pulse generator 102 when the input from matrix 108 and the input from converter 134 are identical or equal for this embodiment of the invention. As will be realized, the two voltages could have some predetermined ratio in other embodiments. When the two voltages are equal, a signal is sent to the pulse generator 102 to supply a second 11.6-msec. pulse to the transducer 70. The output of the pulse generator 102 therefore comprises two 11.6-msec. pulses, the time period between which is proportional to the analog response signal from the particular condition sensing block 118–126. A time base 138 supplies inputs to the pulse generator 102 and the timing counter 98 as well as to the modulator 128. This time base contains two different frequency carriers so that the pulses may be modulated first at 43.95 kilocycles per second and then at 41.65 kilocycles per second.

Because the remote unit must normally be battery operated, conservation of power may be very important. The power supply system 94 therefore applies power only to those circuits which require it at that time. While in standby condition (waiting for a command) only the receiver circuits and a selected few logic circuits have power ON. However, once the receive signal has been recognized, power applied to most of the remaining circuitry. The high power direct voltage for operation of valves and pressure regulators is applied only to those control functions such as 114 and 116 when a command has been decoded which requires it.

None of the specific circuitry has been shown for the various blocks in the system since all of the blocks have conventional circuitry therein. More specific examples of the contents of the blocks will be given in written form later in the specification to partially illustrate the conventionality of the individual blocks.

In the specific embodiment of the invention being described, the operator controls block 10 comprises a number of push button switches. Where the functions are binary, there is one switch for open and one for close. To increase reliability and prevent error, a second button may be provided for the actual actuation of the selected binary function. Thus, the operator would be required to both select the desired function and depress an actuation button. The action thus requires the operator to push two buttons simultaneously. This reduces the chance of accidental actuation. Another push button on the operator controls 10 allows the status interrogation of a selected binary function without initiating any change.

Other push buttons in the operator controls 10 included a group of three for pressure increase, pressure decrease or pressure read. These control and interrogate the pressure regulated valve. A further push button was an error reset button to reset the control system after error detection and a display reset push button for reset of the entire display. Obviously, all of these buttons or switches would not be required in every embodiment and more buttons may be required for some embodiments. The function generator 20 performs a similar function to the operator controls 10 except that it does so automatically on a one minute cycle. Each time a one minute time pulse is received from the time base 32, the automatic function generator 20 initiates its first command. As soon as the response from that command is received, it initiates its second command and then its third, after the second response.

FIGURE 3 is a logic flow diagram of the control unit that illustrates the sequences of processing operation.

As will be noted, the procesing starts at logic function 150. This function first checks to see if either the pressure increase, pressure decrease, or pressure read switch is depressed. If yes, an increase, decrease or read pressure command is encoded and transmitted through a transmitter function 152. If the answer in function 150 is no, the logic checks to see if the valve activate or valve read switch is depressed in function 154. If yes, an open, close or read command is encoded and transmitted through function 156. If the output of function 154 indicates no, a one minute timer is checked by block 158 to see if it is time to initiate any of the automatic comamnds. If it is not time, the sequence returns to the start of the program sequence block 150. If the one minute timer 158 indicates that it is time to start the automatic commands, an automatic command counter is checked by block 160 to see if the third command has been transmitted. If yes, the sequence returns to the start function 150. If the third automatic command has not been transmitted, the next automatic command is encoded and transmitted by function 162. At the completion of each of the transmission functions 150, 156, or 162, a logic sequence waits for a start pulse to be detected by the receiver. This function for detecting the reception is shown as 164. When this start pulse is received, indicating that a response has been received from the remote unit, a measurement counter is started by block 166. A logic circuit then watches for a stop pulse as indicated by block 168. Upon receipt of a stop pulse, the measurement counter contents are transferred into a selected display storage indicated as 170 and the sequence returns to its starting function 150.

Referring now to FIGURE 4 it will be noted that FIGURE 4 is also a flow diagram and is a diagram of the control logic function for block 90 of FIGURE 2. The control logic first looks for a start pulse, using function 200, from the receiver. When a start pulse is detected, the received data word is loaded into a shift register by block 202. A parity check 204 is made of the received word. If the parity check fails (i.e., even parity) an error is indicated by function 206, and the command is ignored. However, if the parity check is good, auxiliary power is turned on by circuit 206. Further, a 5-msec. delay function 208 prevents further operation until the 5-msec. time period has passed. After passage of this time period, the received word is examined to see if it is an azimuth command signal by block 210. If the answer is yes, a command is given by function 212 to turn on compass power. If no, the word is examined for a pressure change command by block 214. If yes, an actuate pressure change control function 216 is actuated and a one-half second delay is waited out by 218. If the answer to block 214 is no, the received word is examined for a pressure read command by function 220. If no, the received word is then examined for a binary function command by function 222. If no, the word is then examined for an alarm or tilt read command by function 224. If block 222 is yes, the proper binary function is selected by function 226, and the word is again examined for a function change command by block 228. If yes, a select binry function actuator 230 is entered. A two and one-half second wait then occurs due to block 232. If the answer to the examination for an alarm or tilt read command by 224 is no, an error is indicated by block 205. As a result of any of these commands and/or delays presented by circuits 212, 218, 220, 224, 232 or 238, a reply must be sent back to the operator unit. The proper data sensor is selected by a function 234 and a start pulse is transmitted by function 236. Block 236 also starts a timing counter by block 238. An analog compare function 240 then compares the output from the timing counter with the signal from the data sensor so as to indicate when to transmit a stop pulse by a block 242. After the stop pulse is transmitted, function 244 will turn OFF the auxiliary power. The control logic then looks for a new start pulse with function 200.

As previously indicated, one specific embodiment of the invention is shown in this application and the circuits for the individual blocks are relatively standard. The shift register 26 is a simple 11 flip-flop shift register. The parity generator 30 is a single flip-flop that changes state each time a one is shifted out of the output shift register. This flip-flop always starts in a true or reference state and after the eleventh bit has been shifted out, the content of the parity generator flip-flop is simply added to the transmitted code word as a twelfth bit. The modulator 28 is a simple logic gate that allows the carrier to pass when its input is a one and blocks the carrier when its input is zero. The low pass filter 34 is a passive RC filter network while the power amplifier 36 is a conventional class-B push-pull circuit.

The transmit receive switch 38 comprises back-to-back diodes in series with the transmit leads between the power amplifier 36 output transformer and the transducer 40. While transmitting, these diodes break down thereby completing the circuit to the transducer. While in the receive mode, the receive voltage from the transducer is not high enough to break down the diodes. The received signal therefore is taken directly across the diodes. The transducer 10 and likewise transducer 70 of FIGURE 2, is a longitudinal vibrator comprising a lead zirconate ceramic element with a magnesium head and brass tail mass.

The pre-amplifier 42 comprises a voltage amplifier, followed by an AGC amplifier and a driver amplifier. The band pass filters 44 and 46 are LC pass band filters one tuned to each of the carrier frequencies 41.65 kHz. and 43.95 kHz. The amplifiers 48 and 56 are conventional. The amplitude modulated detectors 50 and 58 are full wave transformer driven diode detectors with RC low pass filters in their outputs. The threshold detector circuits 52 and 60 each comprise a differential amplifier in a feedback configuration followed by one stage common emitter amplifier.

The data synchronizer 54 is a simple flip-flop in which the start (or stop) pulse is placed as received. It is then clocked out on the next internal system clock thereby synchronizing it with the systems internal timing. The pulse width modulator 62 is a single flip-flop which is set by the start pulse and reset by the stop pulse from the data synchronizer. The measurement counter 64 comprises three binary coded decimal counters, one for each digit to be displayed. The display matrix 18 comprises a matrix of logic gates which receive their control inputs from either the operator controls 10 or the automatic function generator 20. These control signals are decoded and the result is used to direct the output of the measurement counter to the proper display. The display panel 66 comprises lighted indicators for valve status and three sets of neon, numeric readout tubes for the analog functions.

The time base 32 supplies all carriers, clocks and timing signals to the entire operator control unit shown in FIGURE 1. It contains an 87.9-kHz. crystal oscillator and a one stage counter (divide by two) to provide the 43.95-kHz. carrier frequency. This carrier frequency signal is then divided by 128 in a seven bit binary counter to obtain the shift register clock signal of approximately 343 Hz. The seven bit counter is followed by a two bit counter to derive an 86-Hz. clock for use in the control logic. This 86-Hz. clock is divided by 32 in a five bit counter to obtain a 2.7-Hz. clock and again by 32 to obtain a five cycle per minute clock. The 2.7-Hz. clock is divided by 16 in a four bit counter to obtain a six-second timing and the five cycle per minute clock is divided by 5 to obtain the one-minute timing. As previously indicated, a single lead line does not necessarily mean that there is only one wire since the single lead refers to a cable of wires or other connections.

Referring to FIGURE 2, the particular embodiment being referred to above in the remote or underwater unit has several circuits similar or identical to those in the circuits of FIGURE 1. In particular, the circuits 70–82 of FIGURE 2 are substantially identical to those described for FIGURE 1. The input shift register 86 has a 12 flip-flop circuit in which the received control word is placed. The parity check function 88 is a single flip-flop which toggles with each one received. If, after the twelfth bit is received, its state is opposite from its starting state, the parity check is odd and no error is indicated. The control function select matrix 112 comprises a matrix of logic gates which decode the command words and actuate the selected binary function or pressure control. If a pressure control command is decoded, the pressure control function 114 is actuated and is signaled which direction to change. The pressure control includes a plurality of relays to select the polarity of the high power DC supply 94 thereby determining the direction of the control action and further to keep the pulse of a substantially predetermined amount of power. The binary function control 116 is similar to that of pressure control 114 except that the pulse period of the DC supply is longer.

The response data matrix 108 includes a group of relays which select the proper condition sensing function and apply the output from that condition sensor to the analog compare circuit 136. The contents of the particular sensors 118–126 is not pertinent to the present invention. The control logic 90 provides a programming function that sequences the operation of most of the other functions in a manner somewhat similar to that of control logic 14. The previously discussed logic operation of FIGURE 4 illustrates the operation of the logic circuitry contained in control logic 90. The pulse generator 102 is a simple gate which generates an 11.6-msec. pulse and the timing counter 98 is a conventional 8-bit binary counter providing an 8-bit binary word to the digital to analog converter 134. The converter 134 includes 8 two-stage analog gates and an 8 input resistive adder. The output of the resistive adder is an analog voltage proportional to the binary count in the timing counter. The output of the resistive adder is buffered by an operational amplifier.

The analog compare function 136 includes two operational amplifiers in a single transistor buffer amplifier. The first operational amplifier is simply used as an inverter for the signal from the digital to analog converter. The second operational amplifier accepts this inverted signal from the digital to analog converter and a signal from the response data select matrix 108. This operational amplifier is connected in a feedback arrangement so that when the signal from the inverter is lower than that from the data select matrix 108, its output is held low and when the voltage has become equal the output swings high. The output of this second operational amplifier is buffered in a one stage amplifier to provide a compatible logic level output. The modulator 128 is substantially the same as modulator 28 in FIGURE 1 except that it accepts either of two carrier frequencies. One being for the start pulse and the other for the stop pulse. The low pass filter 130 is a simple RC filter network and the power amplifier 132 is a conventional class B push-pull circuit.

While one specific embodiment of the invention has been discussed in detail including the circuit contents within the blocks for this particular embodiment, I do not wish to be limited to the embodiments shown. The invention broadly includes the idea of acoustically sending a control signal over a distance with no physical electrical connections and then monitoring the control by a condition sensing element to make sure that the control was actuated as desired. This condition sensing information is then transmitted back to the original operator control panel by pulses of two different frequencies so as to avoid overlap or multipath bounce in the return signal. In other words, if only a single frequency were utilized, the transmission of the signal through the water will actuate the surface unit. However, multipath reflections from other surfaces will be delayed in time and arrive at the receiver unit soon thereafter. This may actuate the control operator or surface unit prior to the actual transmission of the second pulse thus indicating a low level reading rather than a reading which is actually indicated by the condition sensor.

In view of the above, we wish to be limited not by the scope of the specification or the drawings showing a specific embodiment but only by the scope of the appended claims wherein we claim:

1. The method of providing one of a plurality of control functions in apparatus at a remote point and monitoring the apparatus to determine if the control function was properly performed comprising the steps of:
   checking to determine if a first control function signal is present;
   transmitting a first command from a fixed station if the first control signal is present;
   if the first control signal is not present, checking to determine if a second control function signal is present;
   transmitting a second command from the fixed station if the second control signal is present;
   receiving the command at a remote station;
   storing the command;
   checking the parity of like bits of information in the command to determine if the command contains an even or odd number of given like bits, and ignoring the command if checking determines an error;
   actuating a power source if checking determines there is no error in the command;
   decoding the command to determine which control is to be actuated;
   actuating the indicated control function;
   selecting a condition sensor which monitors the last controlled function;
   transmitting a start pulse of a first frequency from the remote station;
   actuating an integration means simultaneously with the transmission of the start pulse;
   comparing the output of the selected condition sensor with the output of said integration means;
   transmitting a stop pulse of a second frequency when the outputs of the selected condition and said integration means reach predetermined relationships;
   deactivating the power source at the remote station;
   receiving the start and stop pulses at the fixed station; and
   providing an output indicative of the time period between reception of the start and stop pulses, the output indicating the condition of the controlled function.

2. Apparatus for providing control functions between separated stations comprising, in combination:
   control logic means for supplying a binary coded signal;

first means for transmitting the coded signal from a first to a second station;

means for receiving said coded signal at said second station;

means for decoding said coded signal to provide a decoded output signal indicative of a particular control function;

power supply means;

condition sensing means for providing condition information signals;

logic control means for energizing said power supply means and for directing power to a particular condition sensor in response to the decoded output signal;

generating means for providing two pulse output signals of different frequencies the time difference between pulses being indicative of the amplitude of said condition information signal;

second means for transmitting the two pulses to the first station; and means for receiving the two different frequency pulses and for providing an output indicative of the reception time difference therebetween and therefore of the condition being sensed.

3. Apparatus as claimed in claim 2 wherein the coded signal and the pulses are transmitted between stations acoustically.

4. Apparatus as defined in claim 3 wherein:

said control logic means includes control function selection means;

said first means includes parity generator means; and said means for decoding includes parity checking means for ignoring received signals of the wrong parity.

5. Apparatus for acoustically monitoring a remote underwater station from a surface control station comprising, in combination:

signal generating means for supplying a first signal indicative of a desired function;

first control logic means for use in the surface control station for supplying a binary coded second signal in response to the first signal;

means for maintaining the parity of the second signal;

means for acoustically transmitting a third signal indicative of the parity maintained coded signal to the remote underwater station;

means for receiving the third signal from the water at the remote station and supplying a demodulated fourth signal;

power supply means for said remote station;

means for checking the parity of said fourth signal and for preventing further use of said fourth signal when the parity is erroneous;

a plurality of condition sensors for said remote station;

second control logic means for receiving said fourth signal when of the proper parity, decoding said fourth signal, actuating said power supply and selecting one of said plurality of condition sensors as indicated by said fourth signal;

means for simultaneously, acoustically transmitting a first pulse of a first frequency and initiating a varying amplitude fifth signal;

comparison means for comparing the amplitude of said fifth signal and a signal indicative of the condition being sensed and providing an output sixth signal when the compared signals reach predetermined relationships;

means for receiving said sixth signal and acoustically transmitting a second pulse of a second frequency in response to said sixth signal, the time period between said first and second pulses being indicative of the condition being sensed;

means for receiving said first and second pulses at the surface station from the remote station;

means for providing an output seventh signal indicative of the time difference between reception of said first and second pulses; and display means for receiving said seventh signal and providing an output indicative thereof and therefore of the condition being sensed.

6. Apparatus as claimed in claim 5 wherein:

said signaling generating means includes manual and automatic means for supplying a first signal;

the means for acoustically transmitting signals and pulses each includes an electro-mechanical vibrator;

the apparatus additionally includes controlled means; and said second control logic means, upon receipt of a given command via said fourth signal, actuates said controlled means prior to selecting a condition sensor.

7. Apparatus as claimed in claim 6 comprising, in addition:

error indicating means at the surface station for providing an output when return pulses are not received within a predetermined time period; and means connecting said signal generating means to said display means.

References Cited

UNITED STATES PATENTS

| | | | |
|---|---|---|---|
| 3,253,260 | 5/1966 | Hawley | 340—151 |
| 3,258,692 | 6/1966 | Jacomini et al. | 340—151 X |
| 3,313,160 | 4/1967 | Goldman | 340—18 X |

RICHARD A. FARLEY, *Primary Examiner.*

U.S. Cl. X.R.

340—15, 151